United States Patent
Paul et al.

(10) Patent No.: US 9,582,752 B2
(45) Date of Patent: Feb. 28, 2017

(54) DEVICE AND APPARATUS FOR DETERMINING AN OCCUPANCY RATE OF CONVEYING MEANS

(71) Applicant: Krones AG, Neutraubling (DE)

(72) Inventors: Christian Paul, Pentling (DE);
Johannes Vierheilig, Landshut (DE);
Juergen Waetzold, Nittenau (DE);
Michael Keppler, Offenstetten (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 14/934,725

(22) Filed: Nov. 6, 2015

(65) Prior Publication Data

US 2016/0132764 A1    May 12, 2016

(30) Foreign Application Priority Data

Nov. 12, 2014 (DE) .................. 10 2014 116 516

(51) Int. Cl.
| | |
|---|---|
| *B65G 43/08* | (2006.01) |
| *G06M 7/00* | (2006.01) |
| *B65G 15/22* | (2006.01) |
| *G06M 1/02* | (2006.01) |

(52) U.S. Cl.
CPC .............. *G06M 7/00* (2013.01); *B65G 15/22* (2013.01); *B65G 43/08* (2013.01); *G06M 1/02* (2013.01); *B65G 2201/0244* (2013.01); *B65G 2203/044* (2013.01)

(58) Field of Classification Search
CPC ....................................................... B65G 43/08

USPC ...................................... 198/444, 460.1, 572
See application file for complete search history.

(56) References Cited

U.S. PATENT DOCUMENTS

| | | | |
|---|---|---|---|
| 5,276,974 A | 1/1994 | Chanoni et al. | |
| 5,909,013 A | 6/1999 | Dlugos | |
| 6,407,818 B1 | 6/2002 | Whitehouse | |
| 2012/0132503 A1* | 5/2012 | Petrovic ............. | B65G 47/5131 198/572 |

FOREIGN PATENT DOCUMENTS

| | | |
|---|---|---|
| DE | 2631436 A1 | 1/1978 |
| DE | 19530626 A1 | 2/1997 |
| DE | 102010019884 A1 | 11/2011 |
| EP | 0174168 A1 | 3/1986 |
| EP | 0245806 A2 | 11/1987 |
| EP | 0782959 A1 | 7/1997 |

(Continued)

*Primary Examiner* — Gene Crawford
*Assistant Examiner* — Lester Rushin
(74) *Attorney, Agent, or Firm* — Walter | Haverfield LLP; D. Peter Hochberg; Sean F. Mellino

(57) ABSTRACT

A device for determining an occupancy rate of a conveying means is provided. The device comprises an adjusting means for adjusting at least one detecting means such that the at least one detecting means detects, after detecting the freight conveyed by the conveying means, the conveying means without conveyed freight, or such that the at least one detecting means detects, after detecting the conveying means without conveyed freight, the freight conveyed by the conveying means, and a determining means for determining a current occupancy rate of the conveying means on the basis of the position of the at least one detecting means, which was adjusted by the adjusting means.

10 Claims, 3 Drawing Sheets

(56) References Cited

FOREIGN PATENT DOCUMENTS

| FR | 2213481 | 8/1974 |
|----|---------|--------|
| GB | 795525 | 5/1958 |
| WO | WO2005003682 A1 | 1/2005 |
| WO | WO2008116546 A2 | 10/2008 |

* cited by examiner

DEVICE AND APPARATUS FOR DETERMINING AN OCCUPANCY RATE OF CONVEYING MEANS

CROSS-REFERENCE TO RELATED APPLICATION

This application claims foreign priority based on German patent application DE 10 2014 116 516.0, filed on Nov. 12, 2014, the content of which is incorporated herein by reference in its entirety.

BACKGROUND OF THE INVENTION

Field of the Invention

The present invention relates to a device and a method for determining an occupancy rate of conveying means, which conveys in particular containers in a container treatment installation.

Description of the Prior Art

In conveying means for conveying containers in a container treatment installation, several containers can be conveyed side by side in a conveying direction. The conveying means is occupied completely or only in part with containers depending on the velocity of means, like a labeling means, a filling means etc., which are positioned upstream. It is advantageous to regulate, depending on the occupancy rate of the conveying means, the velocity of means, like for example a cleaning means, a packaging means, etc., which are positioned downstream. Therewith, an automatic control and regulation of the container treatment installation can be realized with the smallest possible action of operators.

WO 2008/116546 A2 shows a method for observing, controlling and optimizing of filling installations for food, in particular for beverage bottles. The method is used for observing installations or machines. Herein, an optoelectronic identification system in the form of an electronic camera is deployed to gain the necessary control data. The optical identification systems can be used for observing the occupancy rate of buffer tables.

A disadvantage of such optical identification systems lies in that the camera systems get to its limits in the processing of container surfaces which are not cooperative. Thereby, a stabile detection of the occupancy rate is not ensured.

For solving these problems, it would be conceivable to replace the camera systems by other sensors. However, the available sensors have a high complexity level. This is apparent especially because of a high individual adjustment effort for different container types, which is realized by specific software. This makes a device for detecting the occupancy rate of the conveying means more costly. In addition, stand still periods of the container treatment installation will occur in the operation of the device for detecting the occupancy rate of the conveying means because of the adjusting works necessary in case a new container type is to be conveyed by the conveying means. This instant raises the operating costs of the conveying means and the container treatment installation.

SUMMARY OF THE PRESENT INVENTION

Therefore, it is the object of the present invention to provide a device and a method for determining an occupancy rate of a conveying means, with which the above-mentioned problems can be solved. In particular, a device and a method for determining an occupancy rate of a conveying means shall be provided with which it is realizable easily, flexibly and with low costs to determine the occupancy rate of a conveying means.

This object is solved by a device for determining an occupancy rate of a conveying means according to claim 1. The device comprises adjusting means for adjusting at least one detecting means such that the at least one detecting means detects, after detecting the freight conveyed by the conveying means, the conveying means without conveyed freight, or such that the at least one detecting means detects, after detecting the conveying means without conveyed freight, the freight conveyed by the conveying means, and a determining means for determining a current occupancy rate of the conveying means on the basis of the position of the at least one detecting means, which was adjusted by the adjusting means.

The device comprises only simple, process-stable standard components. Therefore, no expert knowledge or specific software for adjusting the device is necessary. The device does not need intelligent detecting means, like for example sensors based on light cut methods or camera or laser technology. Due to this, the hardware effort necessary for the device is reduced, as well.

The above-mentioned device provides a very efficient and inexpensive possibility for detecting or determining the occupancy rate. Herein, only a very small effort for calibrating and referencing accrues.

In particular, the occupancy rate of the conveying means can be securely detected by the device independently from the type of the containers. Therewith, no adjusting of the detecting means to the type of the container is required. Due to this, there arises a remarkable cost reduction in the production of the conveying means by omission of intricate evaluation software which was necessary so far. By the device, a remarkable time and therewith cost reduction in the operation of the conveying means results.

It is possible moreover to use the device, because of its simple construction, essentially independently from the width of the conveyor belt which is to be detected. It is in particular possible to use the device also for conveyor belt widths >600 mm, in particular up to conveyor belts widths of approximately 1200 mm, what causes problems with the known solutions up to now.

Advantageous further developments of the device are given in the dependent claims.

It also possible, that the adjusting means for adjusting at least two detecting means is configured such that one detecting means of the detecting means detects the freight conveyed by the conveying means and the other detecting means of the detecting means detects the conveying means without conveyed freight, and wherein the determining means determines the current occupancy rate of the conveying means on the basis of the position of at least one of the detecting means and which was adjusted by the adjusting means.

It is conceivable, that the at least two detecting means are configured to detect transverse to the conveying plane of the conveying means.

It is possible, too, that the device further comprises supporting means for supporting the at least one detecting means and/or for supporting at least two detecting means such that the at least two detecting means are positioned with a predetermined fixed distance to each other. Herein, the supporting means can be configured for positioning the at least one detecting means above the conveying means.

The supporting means can comprise an accommodating unit which is configured for accommodating the at least one detecting means and which is configured as a sledge or towing rope such that the at least one detecting means is linearly moveable above the conveying means.

Advantageously, the device further comprises a position detecting means for detecting a position of the at least one detecting means and/or the accommodating unit at the supporting means, wherein the accommodating unit accommodates the at least one detecting means. It is possible to effect an indirect measurement of the occupancy rate of the conveying means by the position detecting means.

The at least one detecting means possibly comprises a contactless sensor.

The above-described device can be a part of a conveying means for conveying containers, wherein the conveying means further comprises a conveyor belt for conveying the containers in a predetermined conveying direction.

Herein, it is also possible, that the conveying means further comprises at least one further conveyor belt which is drivable independently from the conveyor belt with a velocity different from the velocity of the conveyor belt.

The object is further solved by a method for determining an occupancy rate of a conveying means according to claim 10. The method comprises the steps: adjusting, by an adjusting means, at least one detecting means such that the at least one detecting means detects, after detecting freight conveyed by the conveying means, the conveying means without conveyed freight, or such that the at least one detecting means detects, after detecting the conveying means without conveyed freight, the freight conveyed by the conveying means, and determining, by a determining means, a current occupancy rate of the conveying means on the basis of the position of the at least detecting means, which was adjusted by the adjusting means.

The method achieves the same advantages as mentioned above in respect of the device.

Further possible implementations of the invention comprise also combinations of features or styles described above or in the following with reference to the embodiments, even if they are not explicitly mentioned. Herein, the person skilled in the art will also add single aspects as improvements or additions to the respective basic form of the invention.

BRIEF DESCRIPTION OF THE DRAWINGS

In the following, the invention is described in more detail by means of embodiments and with reference to the appended drawing Figures, wherein.

In the figures, the same or functionally same elements are provided with the same reference signs unless given otherwise.

DETAILED DESCRIPTION OF THE PRESENT INVENTION

Figure 1:
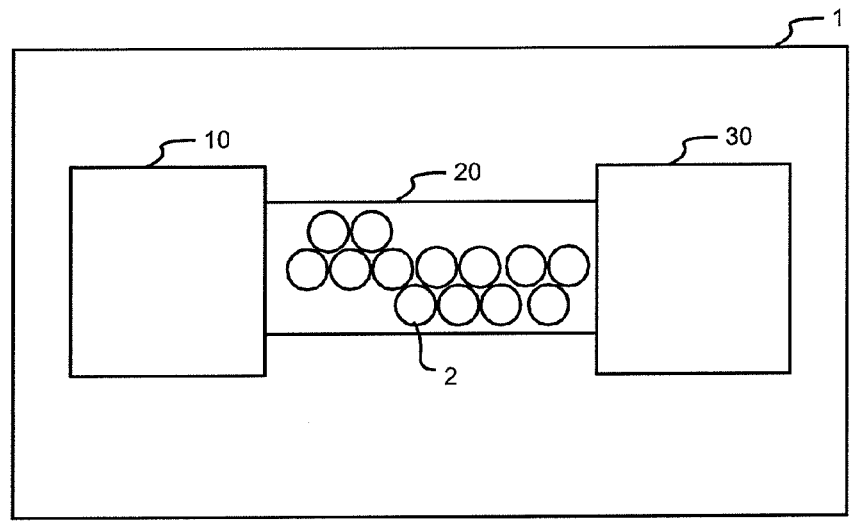
FIG. 1 shows a block diagram for illustrating a machine comprising a device according to a first embodiment.

FIG. 1 shows a machine 1 which can be a container treatment installation, for example. In the container treatment installation, containers 2, in particular transparent plastic bottles, glass bottles, metal cans, empty, full, closed, unclosed, labeled, not labeled, etc., are produced and/or treated. Even if the machine 1 is described in the following partly as a container treatment installation as an example, the machine 1 is not limited thereto. In FIG. 1, not all of the containers 2 are provided with a reference sign for the sake of simplicity.

The machine 1 comprises a first treatment means 10, a conveying means 20, and a second treatment means 30. The first treatment means 10 is, for example, a labeling means for labeling containers 2 with a label. The second treatment means 30 is for example a filling means for filling the containers 2 with a medium, like for example a liquid, a powder, etc., in particular a beverage, a detergent, etc. The conveying means 20 conveys the containers 2 as freight from the first treatment means 10 to the second treatment means 30.

Figure 2:
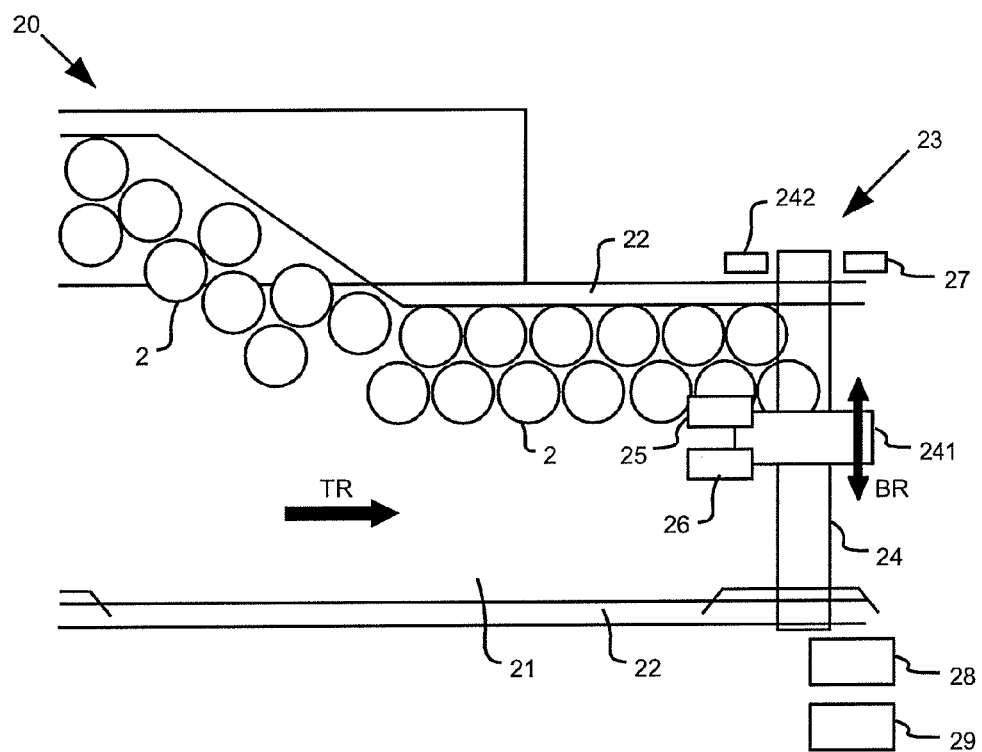
FIG. 2 shows a top view of a conveying means of the machine comprising a device according to the first embodiment.

FIG. 2 shows a part of the conveying means 20 in more detail. The conveying means 20 has a conveyor belt 21 for conveying freight, like for example the container 2, in a conveying direction TR. The conveying means 20 further comprises guardrails 22 which are located on the both sides of the conveyor belt 21 and guide the freight on the conveyor belt 21. In FIG. 2, the conveyor belt 21 and therewith the conveyor means 20 is only partly occupied with freight in the form of the containers 2. Due to this, the other part of the conveyor belt 21 is free from freight in the form of the containers 2. The occupancy rate of the conveying means 20 in FIG. 2 is approximately 35%. As a result, approximately 65% of the conveying means 20 are not occupied with freight in the form of the containers 2.

As further shown in FIG. 2, a device 23 for determining an occupancy rate of the conveying means 20 is mounted to the conveying means 20. The device 23 has a supporting means 24, an accommodating unit 241, a driving means 242, a first detecting means 25, a second detecting means 26, a position detecting means 27, an adjusting means 28 and a determining means 29. The accommodating unit 241 is moveable by the driving means 242 in a moving direction BR. The adjusting means 28 is combined with the driving means 242 or controls the driving means 242.

Figure 3:
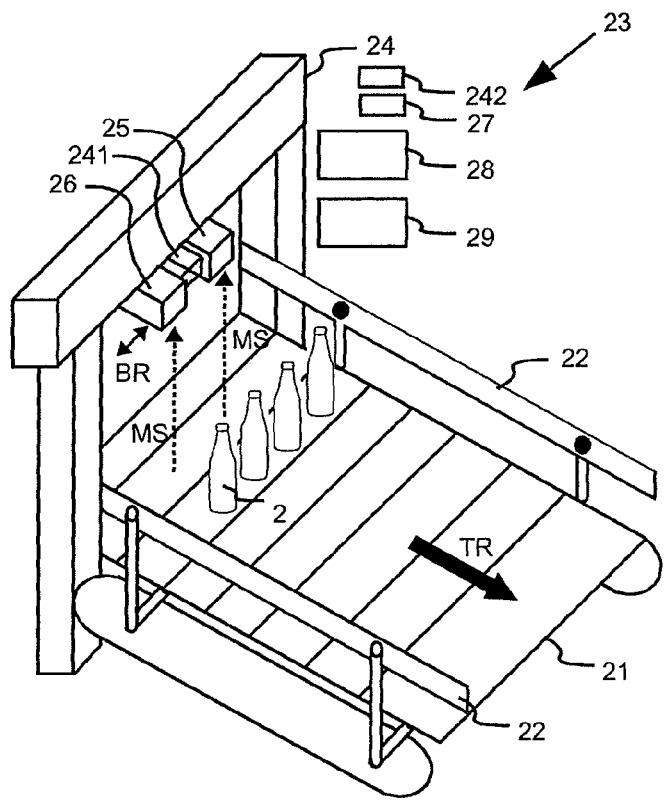
FIG. 3 shows a three-dimensional detail of a device for determining an occupancy rate of the conveying means according to the first embodiment.
Figure 4:
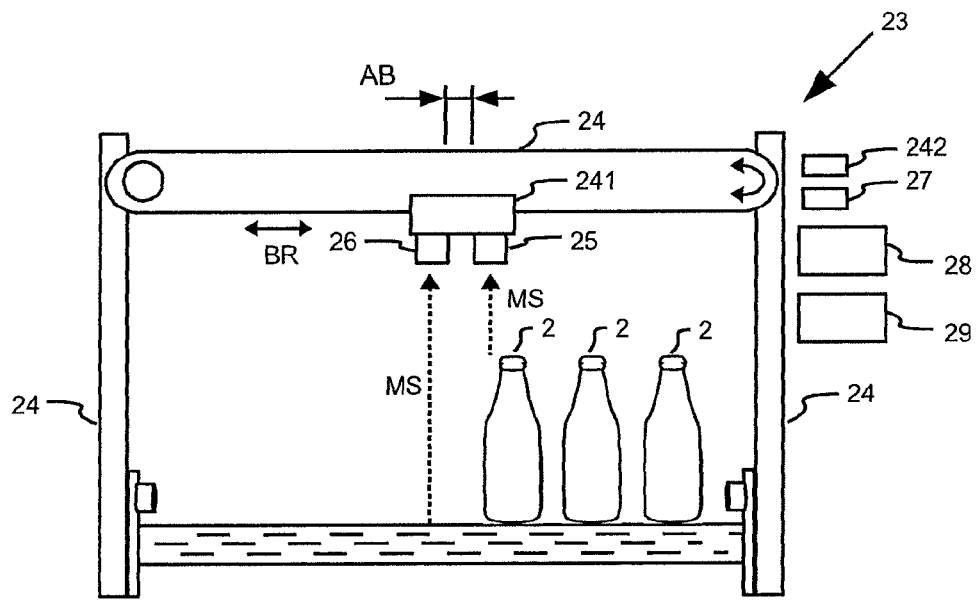
FIG. 4 shows a side view of the device for determining an occupancy rate of the conveying means according to the first embodiment.

As can be seen in FIG. 3 and FIG. 4, a part of the supporting means 24 is positioned together with the accommodating unit 241 and the first and second detecting means 25, 26 above the conveying means 20. In more detail, the accommodating unit 241 and the first and second detecting means 25, 26 are located above the conveyor belt 21. The supporting means 24 is formed as a U-formed rack to which the accommodating unit 241 is mounted.

The first and second detecting means 25, 26 are accommodated to the accommodating unit 241, namely such that the first and second detecting means 25, 26 are spaced to each other by the fixed predetermined space or distance AB, as depicted in FIG. 4. In other words, the supporting means 24 supports the first detecting means 25 with the predetermined fixed distance AB to the second detecting means 26.

In contrast thereto, the accommodating unit 241 is seated moveably at the supporting means 24. Therewith, the accommodating unit 241 can be moved, in the direction of the arrow referenced with BR, together with the first and second detecting means 25, 26 as a unit in comparison to the supporting means 24. The arrow indicates thus the moving direction BR of the accommodating unit 241 and the first and second detecting means 25, 26.

As shown in FIG. 2 and FIG. 3, the accommodating unit 241 is implemented in the present embodiment as a sledge to which the first and second detecting means 25, 26 are mounted. The sledge can be driven by the driving means 242 which is in particular an electric motor. Therewith, the accommodating unit 241 and the detecting means 25, 26 are put into a common linear motion over the conveying means 20.

Thus, the accommodating unit 241 can be moved together with the first and second detecting means 25, 26 back and forth in the moving direction BR over the conveying means 20. In other words, the first and second detecting means 25, 26 can be moved transverse to the conveying direction TR in respect to the conveying means 20. The moving direction BR of the accommodating unit 241 and the first and second detecting means 25, 26 is positioned transverse, in particular vertically, to the conveying direction TR of the conveyor belt 21. The term "transverse" comprises in this regard an angle between 1 o and 90° in comparison to the conveying direction TR. As a result, the device 23 can be used at a shift over at which the containers 2 are transferred or Shifted from the conveyor belt 21 to a further conveyor belt 22 positioned laterally to the conveyor belt 21. In this instance, the device 23 could be mounted as another assembly than assembled orthogonally to the conveying direction TR.

The supporting means 24 is also configured for moveably supporting the first and second detecting means 25, 26 such that the first and second detecting means 25, 26 are linearly movable together over the conveying means 20.

The first and second detecting means 25, 26 are each in particular contactless and/or sampling sensors, as for example an optical sensor operating by the use of light, for example infrared light, laser light, etc. The first and second detecting means 25, 26, each, can however also be an acoustic sensor operating by the use of sound waves, preferably ultrasound. The first and second detecting means 25, 26 can further each be a capacitive sensor. The first and second detecting means 25, 26 can be configured such that, the respective detecting means 25, 26 comprises both a transmitter for transmitting the detection waves and a receiver for receiving the detection waves. As illustrated in FIG. 3 and FIG. 4, the detecting waves are transmitted from the conveying means 20 or the freight back to the detecting means 25, 26 in the direction of an arrow referenced with MS. In case freight in the form of a container 2 is present beneath the first or second detecting means 25, 26, the detecting waves transmitted by the transmitter are reflected to the receiver in another way than in the case in which only the conveyor belt 21 is located beneath the detecting means 25, 26. The first and second detecting means 25, 26 are thus configured to the detect transverse, in particular vertically, to the conveyance level in the form of the conveyor belt 21 of the conveying means 20.

The adjusting means 28 adjust the first detecting means 25, such that, the first detecting means 25 detects the freight by the conveying means 20, as shown in FIG. 4. In the position of the first detecting means 25 shown in FIG. 3 and FIG. 4, the first detecting means 25 detects the freight in the form of the containers 2, as well.

Further, the adjusting means 28 adjusts the second detecting means 26 such that the second detecting means 26 detects the conveying means 20 without freight, as shown in FIG. 3 and FIG. 4. In the position of the second detecting means 26, shown in FIG. 4, the second detecting means 26 detects, thus, no freight in the form of the containers 2 but detects the conveyor belt 21.

The position of the first and second detecting means 25, 26 and/or the position of the accommodating unit 241 are/is detected by a position detecting means 27 and is forwarded to the determining means 29 in the form of one or more detecting signals. The position detecting means 27 can be a rotary encoder, in particular an incremental rotary encoder.

Initially, the determining means 29 determines, whether the adjusting means 28 adjusted the first and second detecting means 25, 26, as shown in FIG. 3 and FIG. 4 and as described above. Is this the case, the determining means 29 determines the current occupancy rate of the conveying means 20. The determining means 29 uses herein the position of the first and second detecting means 25, 26 at the conveying means 20, which was determined by the position detecting means 27. In other words, the determining means 29 determines the current occupancy rate of the conveying means 20 on the basis of the positions of the first and second detecting means 25, 26 which were adjusted by the adjusting means 28.

The determined occupancy rate can be used for realizing efficient control algorithms, as for example a regulation of the machine 1, a fast product change and/or an unsymmetrical dynamical distribution of container streams.

The device 23 performs in this way no direct measurement of the occupancy rate by optoelectronic sensors, for example. In contrast thereto, the detecting means 25, 26 acts as a tool for an indirect measurement which requires less effort than hardware, software, calibration, etc.

In a method for determining an occupancy rate of the conveying means, the first detecting means 25 is adjusted thus in a first step by the adjusting means 28, such that the first detecting means 25 detects freight or goods which are to be conveyed by the conveying means 20. Further, the adjusting means 28 adjusts the second detecting means 26 such that the second detecting means 26 detects the conveying means 20 without freight. Thereafter, the determining means 29 determines the current occupancy rate of the conveying means 20 on the basis of the position of the first and second detecting means 25, 26, which was adjusted by the adjusting means 28.

Alternatively, the adjusting means 28 can also adjust the second detecting means 26 such that the second detecting means 26 detects freight by the conveying means 20. In this case, the adjusting means 28 adjusts the first detecting means 25 such that the first detecting means 25 detects the conveying means 20 without the freight.

In general, the adjusting means 28 adjusts the detecting means 25, 26 such that one of the detecting means 25, 26 detects freight or goods which are to be conveyed by the conveying means 20 and the other one of the detecting means 25, 26 detects the conveying means 20 without the freight.

The above-described method for determining the occupancy rate is preceded by an initial referencing of the device 23. The referencing can be performed, for example, via a linear method of the at least one detecting means 25, 25 and/or the accommodating unit 241 starting from a defined starting position, for example 0% or 100% occupancy rate of the conveying means 20, and including the whole width of the device. Herein, reaching of the maximally possible traveling distance of the detecting means and/or the accommodating unit is recognized by a sensor, preferably by a final position switch, and this position is then defined as 0% or 100% depending on the start position.

For recognizing the occupancy rate of 0% or 100% in which one of the detecting means 25, 26 is positioned at the 0% or 100% position at the conveying means 20, the both detecting means 25, 26 do not have to comprise a final position switch in any case. The both detecting means 25, 26 can also be configured to recognize the guardrail 22. It is used herein, that the guardrail 22 is higher than the conveyor belt 21 to which the detecting means 25, 26 are referenced before the operation of the detecting means 25, 26. However, final position switches which are not shown could be installed as an additional security to stop the driving means 242 to drive the accommodating unit 241, in case the maximum traveling distance in the moving direction BR is reached at the supporting means 24 or above the conveying means 20.

Therewith, there is a further possibility for referencing in that the detecting means 25, 26 and/or the accommodating unit 241 are driven linearly in the event of an empty conveyor belt 21 and starting from their starting position until it is recognized, that the at least one detecting means 25, 26 does no longer detect the conveyor belt 21 but, for example, one guardrail 22.

It is also conceivable that reflectors are mounted to the top side of the guardrails 22 mounted on both sides and that the at least one detecting means 25, 26 is driven starting from its starting position until the detecting means detects a first reflector and thus the corresponding guardrail 22. Subsequently, an inversion of the direction of the considered detecting means 25 and/or 26 is performed until a second reflector stripe is detected. On the basis of the driving paths, it can then be concluded to the 0% or 100% position of the considered detecting means 25 and/or 26.

It is further possible, that when activating a mechanical jam switch mounted in the region of the guardrails 22 beneath the device 23 during the operation of the conveying means 20, the position of the at least one detecting means 25, 26 and/or the accommodating unit 241 in the time point of activating the switch is referenced as 100% occupancy rate. This makes a (additional) referencing possible whenever there is a jam situation on the conveying means 20, in which the conveyor belt 21 is completely occupied with containers 2.

The mentioned possibilities for referencing can be performed manually, for example by a software command or a mechanical switch, and/or automatically.

In this way, the device 23 forms a system comprising two simple sampling sensors, the detecting means 25, 26. The sensors are drivable together linearly and are mounted spaced to each other by a defined space or distance AB, in particular vertically, above the conveyor belt 21. The accommodating unit 241 as a linear axis is herein adjustable, in particular by a motor, and the position of the mounted sensors above the conveyor belt 21 is measurable. The sensors are now always brought into a position so that one of the sensors can detect the container stream formed by the containers 2 as freight and the other sensor remains free. When recognizing another state, the adjusting means 28 re-adjusts in a specific definition until the desired state is reached again. By evaluating the sensor position, it can be concluded to the current occupancy rate of the conveyor belt 21 and therewith the conveying means 20.

Altogether, the device 23 offers a simple and little accident-sensitive way to determine or to measure the occupancy rate of the conveying means 20. The employed detecting means 25, 26 have to recognize only roughly, whether or not the container stream is present on the region of the conveying means 20, which region is detected by the respective detecting means 25, 26. This corresponds to a digital detection of 0 an 1 and is no exact measuring, for example in respect of light running times, brilliance, sound wave running times, etc. The accommodating unit 241 to which the detecting means 25, 26 are mounted, travels transverse, in particular vertically, to the conveying direction TR of the conveying means 20, or in particular in parallel to the conveying level performed by the conveyor belt 21, until one of the detecting means 25, 26 detects the container stream and the other one of the detecting means 25, 26 is "free". The position of the accommodating unit 241 which is reached when entering in this state can then be converted into the occupancy rate of the conveying means 20.

Figure 5:
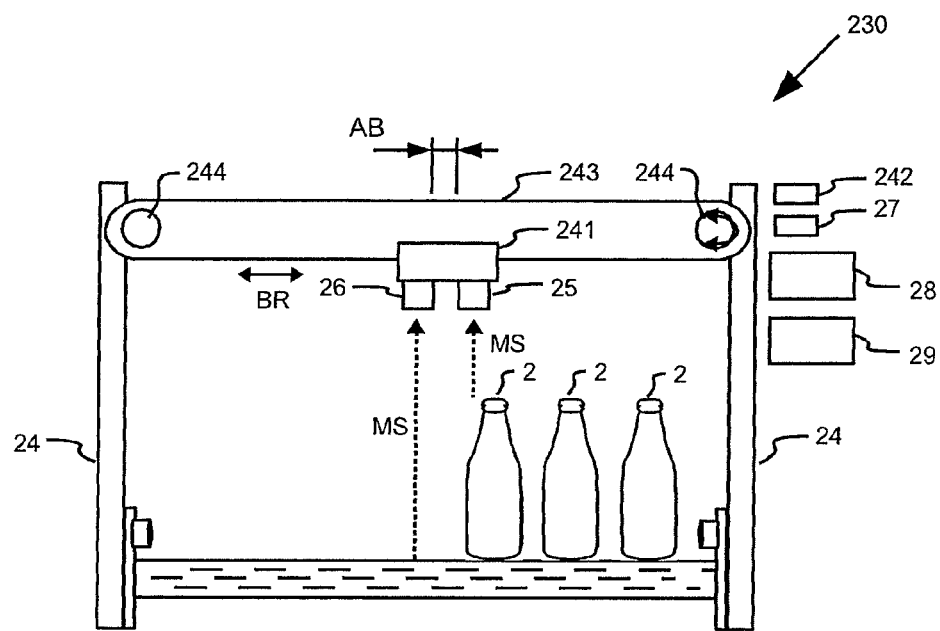
FIG. 5 shows a side view of the device for determining an occupancy rate of the conveying means according to the second embodiment.

FIG. 5 shows a device 230 at a conveying means 20 according to a second embodiment. In the present embodiment, the accommodating unit 241 is positioned at a towing unit 243, as for example a towing rope, which transfers the accommodating unit 241, and therewith the first and second detecting means 25, 26, in a common linear motion across the conveying means 20 by towing around reversing shafts 244. At least one of the reversing shafts 244 can be driven a driving means 242, in particular an electric motor. Apart from that, the machine 1 according to the second embodiment is implemented in the same way as in the preceding embodiment.

Figure 6:
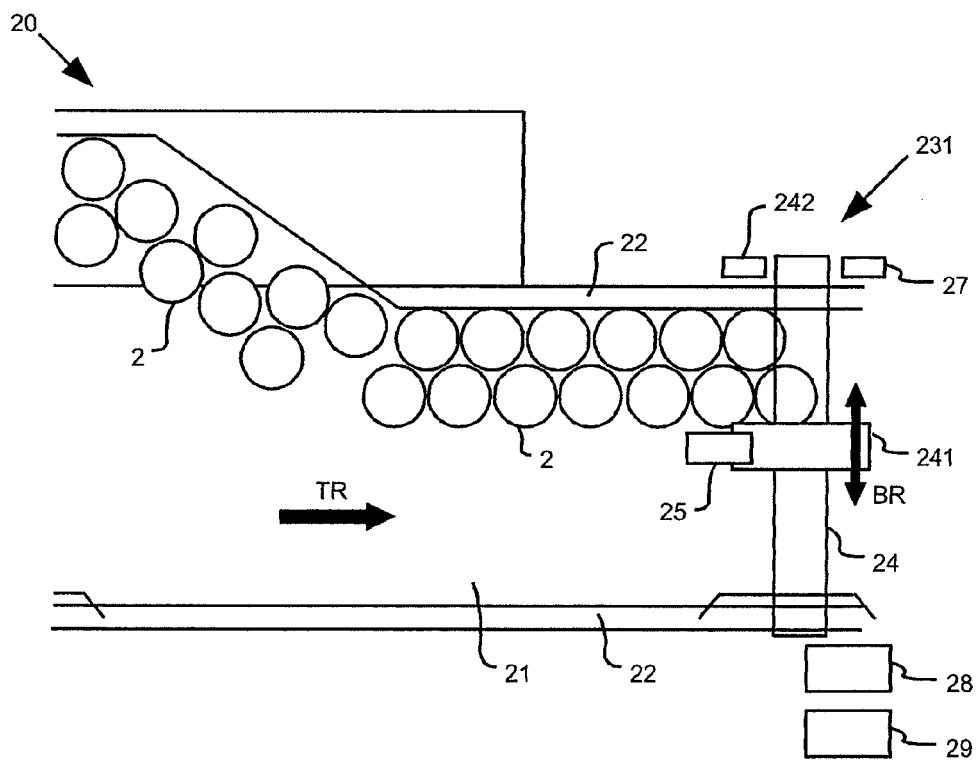
FIG. 6 shows a top view of a conveying means of the machine comprising a device according to a third embodiment.

FIG. 6 shows the device 231 at a conveying means 20 according to a third embodiment. In the present embodiment, only the first detecting means 25 is positioned at the accommodating unit 241 as the only detecting means. Apart from that, the device 231 is constructed in the same way as the device 23 according to the first embodiment.

Since there is thus only one detecting means, namely the first detecting means 25, for determining the occupancy rate of the conveying means 20, the device 231 according to the present embodiment performs the method described in the following.

For determining the occupancy rate of the conveying means 20, the detecting means 25 travels starting from the position corresponding to an occupancy rate of the conveying means 20 of 0% until the detecting means 25 detects or "sees" no longer a container 2. In the case of a complete occupation of the conveying means 20 by containers 2, the detecting means 25 travels as far as the position corresponding to an occupancy rate of the conveying means 20 of 100%. The both positions can also be named 0%-position and 100%-position. The detecting means 25 detects both in the 0%-position and the 100%-position the conveying means 20 without freight, namely for example the guardrail 22 of the conveying means 20.

Apart from that, the device 231 executes the same methods as the device 23 according to the first embodiment.

According to a fourth embodiment, two accommodating units 241 comprising each two detecting means 25, 26 are employed in the devices 23 according to the first or second embodiment. The two accommodating unit 241 can thus be moved to each other, thus, are controllable, with fixed distance to each other or independently from each other. Such an assembly has the advantage that the dimensions of a container stream conveyed in the middle of the conveyor belt 21 of the conveying means 20 can be detected from two sides. Consequently, the occupancy rate of the conveying means 20 can be determined in this way, too.

According to a fifth embodiment, it is also possible that a separate accommodating unit 241 can be provided for each detecting means 25, 26 of one of the first, second or fourth embodiments. Also here, the two accommodating unit 241 can either be coupled with the respective detecting means 25, 26, whereby they are driven, thus, are controllable, with a fixed distance to each other, or are driven separately with a driving means 242, respectively. The control effort for controlling the detecting means 25, 26 is here however higher than in the above-described embodiments where two detecting means 25, 26 are involved.

All of the above-described implementations of the conveying means 20, the devices 23, 230, 231, and the method can be used separately or in all possible combinations thereof. In particular, features can be omitted, as long as they are not described as being essential for the invention. In addition, the features of all of the described embodiments are combinable with each other arbitrarily. Moreover, in particular, the following modifications are conceivable.

The elements shown in the figures are depicted schematically and can differ in the specific implementation from the forms shown in the figures provided that the above-described functions are ensured.

The conveying means 20 can comprise at least one further conveyor belt which is drivable independently from the conveyor belt 21 so that it has another velocity than the conveyor belt 21.

One of the detecting means 25, 26 can also be implemented as an optical sensor and the other one of the detecting means 25, 26 can be implemented as an acoustic sensor. Further, a combination of all of the sensor type mentioned in the description of the invention is conceivable.

There can also be present more than the two detecting means 25, 26, as long as one thereof is adjusted by the adjusting means 28 for detecting the freight and the other one is adjusted for detecting the conveyor belt 21.

It is also possible, that one of the detecting means 25, 26 which is previously adjusted for detecting the conveyor belt 21 is adjusted thereafter for detecting the freight and vice versa.

The adjusting means 28 and the determining means 29 can be implemented by a control means of the machine 1 or a control means of the conveying means 20. Thus, the adjusting means 28 and the determining 29 can be combined in one means, for example a computer, in particular, as control means of the machine 1. It is also possible, that the adjusting means 28 is implemented by a control means of the conveying means 20 and the determining means 29 is implemented by a control means of the machine 1.

What is claimed is:

1. A device for determining an occupancy rate of a conveying means for conveying freight in a predetermined conveying direction, the device comprising:
   at least one detecting means which comprises in one unit both a transmitter for transmitting detecting waves and a receiver for receiving the detecting waves,
   adjusting means for adjusting the transmitter and the receiver of the at least one detecting means such that the at least one detecting means receives detecting waves transmitted by the transmitter to the freight or the conveying means, and reflected from the freight or the conveying means, and for adjusting the at least one detecting means in respect to the conveying means by moving the detecting means transverse to a conveying direction of freight conveyed by the conveying means such that the at least one detecting means detects, after detecting the freight conveyed by the conveying means, the conveying means without conveyed freight, or such that the at least one detecting means detects, after detecting the conveying means without conveyed freight, the freight conveyed by the conveying means, and
   determining means for determining a current occupancy rate of the conveying means with conveyed freight on the basis of the position of the at least one detecting means in respect to the conveying means, following the adjustment of the at least one detecting means by the adjusting means.

2. The device according to claim 1,
   wherein the adjusting means for adjusting the transmitter and the receiver is configured such that one detecting means of the detecting means detects freight conveyed by the conveying means and the other detecting means of the detecting means detects the conveying means without conveyed freight, and
   wherein the determining means determines the current occupancy rate of the conveying means on the basis of the position of at least one of the detecting means, following the adjustment of the at least two detecting means by the adjusting means.

3. The device according to claim 1,
   wherein the at least one detecting means comprises at least two detecting means and the at least two detecting means are configured to detect transverse to the conveying level of the conveying means, and/or
   wherein the device further comprises supporting means for supporting at least one detecting means and/or for supporting at least two detecting means such that the at least two detecting means are positioned with a predetermined fixed distance to each other.

4. The device according to claim 3, wherein the supporting means is configured for positioning at least one detecting means above the conveying means.

5. The device according to claim 1, wherein the supporting means comprises an accommodating unit configured for accommodating the at least one detecting means and which is configured as a sledge or towing rope such that the at least one detecting means is linearly moveable above the conveying means.

6. The device according to claim 1, and further comprising position detecting means for detecting a position of the at least one detecting means at the supporting means and/or a position of the accommodating unit at the supporting means, wherein the accommodating unit accommodates the at least one detecting means.

7. The device according to claim 1, wherein the at least one detecting means comprises a contactless sensor.

8. A conveying means for conveying containers, the conveying means comprising:
   a conveyor belt for conveying the containers in a predetermined conveying direction, and
   a device for determining an occupancy rate of a conveying means, the device comprising:
      at least one detecting means which comprises in one unit both a transmitter for transmitting detecting waves and a receiver for receiving the detecting waves,
      adjusting means for adjusting at least one detecting means such that the at least one detecting means receives detecting waves transmitted to the freight or the conveying means and reflected from the freight or from the conveying means and in respect to the conveying means by moving the at least one detecting means transverse to a conveying direction of freight conveyed by the conveying means, such that the at least one detecting means detects, after detecting the freight conveyed by the conveying means, the conveying means without conveyed freight, or such that the at least one detecting means detects, after detecting the conveying means without conveyed freight, the freight conveyed by the conveying means, and determining means for determining a current occupancy rate of the conveying means with conveyed freight on the basis of the position of the at least one detecting means in respect to the conveying means, following the adjustment of the detecting means by the adjusting means.

9. The conveying means according to claim 8, wherein the conveying means further comprises at least one further conveyor belt which is drivable independently from the conveyor belt with a velocity different from the velocity of the conveyor belt.

10. A method for determining an occupancy rate of a conveying means, the method comprising the steps of:

adjusting, by an adjusting means, at least one detecting means, which comprises in one unit both a transmitter for transmitting detecting waves and a receiver for receiving the detecting waves, such that the at least one detecting means receives detecting waves transmitted to the freight or the conveying means and reflected from the freight or from the conveying means and for adjusting the at least one detecting means in respect to the conveying means by moving the at least one detecting means transverse to a conveying direction of freight conveyed by the conveying means such that the at least one detecting means detects, after detecting freight conveyed by the conveying means, the conveying means without conveyed freight, or such that the at least one detecting means detects, after detecting the conveying means without conveyed freight, the freight conveyed by the conveying means, and determining, by a determining means, a current occupancy rate of the conveying means with conveyed freight on the basis of the position of the at least one detecting means in respect to the conveying means, which at least one detecting means was adjusted by the adjusting means.

* * * * *